US012309119B2

(12) United States Patent
Isola et al.

(10) Patent No.: US 12,309,119 B2
(45) Date of Patent: May 20, 2025

(54) WEB APPLICATION FIREWALL CENTRALIZED MANAGEMENT

(71) Applicant: Bank of America Corporation, Charlotte, NC (US)

(72) Inventors: Rahul Isola, Cornelius, NC (US); Mario Alberto Calderon, Durham, NC (US)

(73) Assignee: Bank of America Corporation, Charlotte, NC (US)

( * ) Notice: Subject to any disclaimer, the term of this patent is extended or adjusted under 35 U.S.C. 154(b) by 411 days.

(21) Appl. No.: 17/977,147

(22) Filed: Oct. 31, 2022

(65) Prior Publication Data

US 2024/0146692 A1 May 2, 2024

(51) Int. Cl.
 *H04L 9/40* (2022.01)
(52) U.S. Cl.
 CPC ............... *H04L 63/0263* (2013.01)
(58) Field of Classification Search
 CPC ............. H04L 63/0263; H04L 63/20
 See application file for complete search history.

(56) References Cited

U.S. PATENT DOCUMENTS

| 9,413,634 | B2 | 8/2016 | Nadeau et al. |
| 9,491,201 | B2 | 11/2016 | Bagepalli et al. |
| 10,205,632 | B2 | 2/2019 | Saavedra |
| 10,212,134 | B2 | 2/2019 | Rai |
| 10,484,334 | B1 * | 11/2019 | Lee ................... H04L 67/30 |
| 11,228,565 | B1 * | 1/2022 | Levin ................. H04L 63/029 |
| 2017/0093917 | A1 | 3/2017 | Chandra et al. |
| 2019/0306194 | A1 * | 10/2019 | Benson ............... H04L 63/102 |
| 2019/0364072 | A1 * | 11/2019 | Purusothaman .... H04L 63/0263 |

* cited by examiner

*Primary Examiner* — Brian F Shaw
(74) *Attorney, Agent, or Firm* — Banner & Witcoff, Ltd.

(57) ABSTRACT

Centralized management of web application firewalls (WAFs) is disclosed. Network-security devices in data centers perform server load balancing and implement WAFs for applications. Vendor-specific bridges map application and system parameters for use by a management process. Policies for policy-name/device pairs are provided and grouped into policy groups, which can be included with global parent policy groups. Portions of policy metadata can be retrieved without degrading system performance to detect changes, which can then be synchronized across other applicable policies, groups, devices, and WAFs.

20 Claims, 11 Drawing Sheets

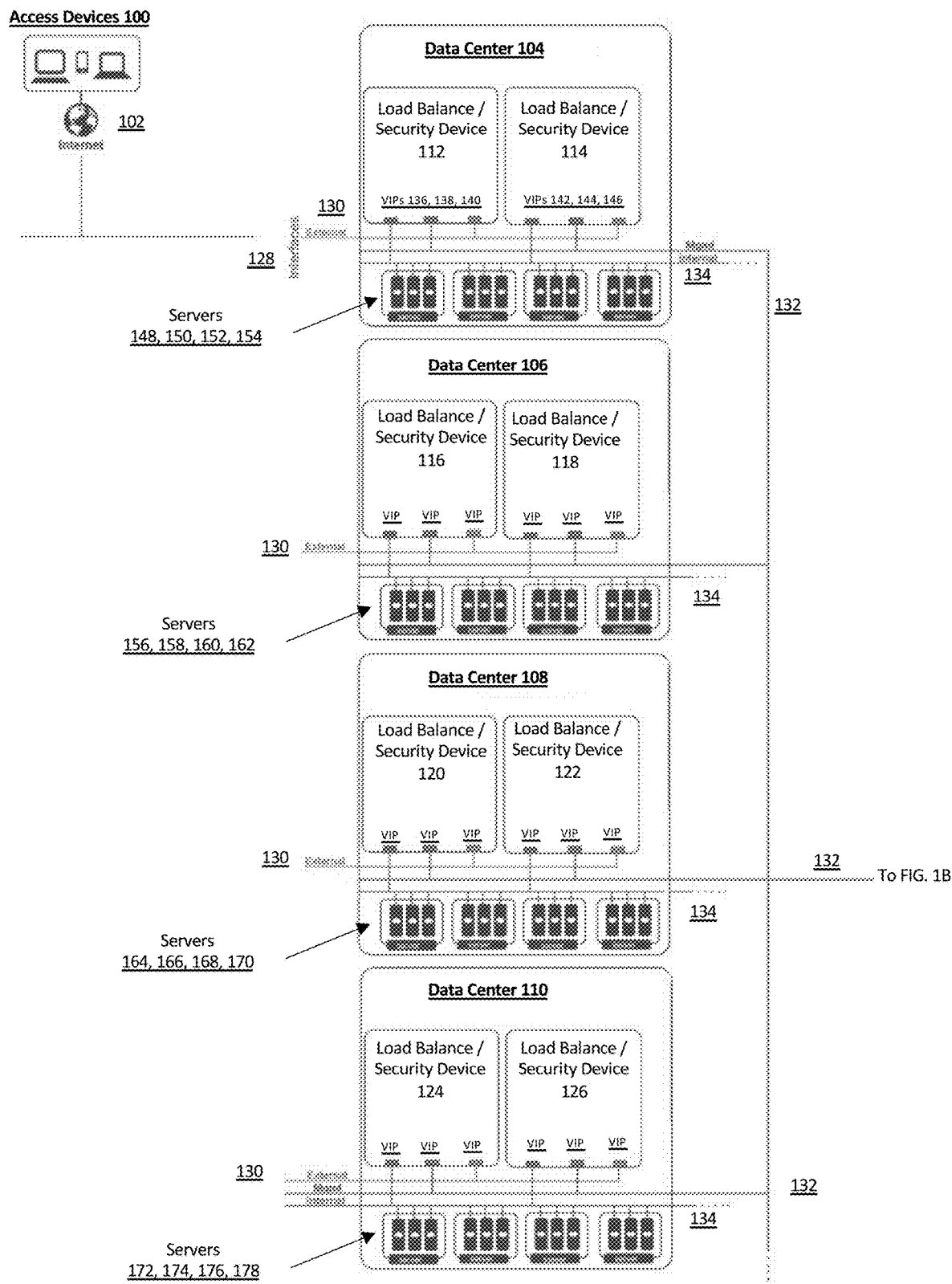
FIG. 1A (Partial View)

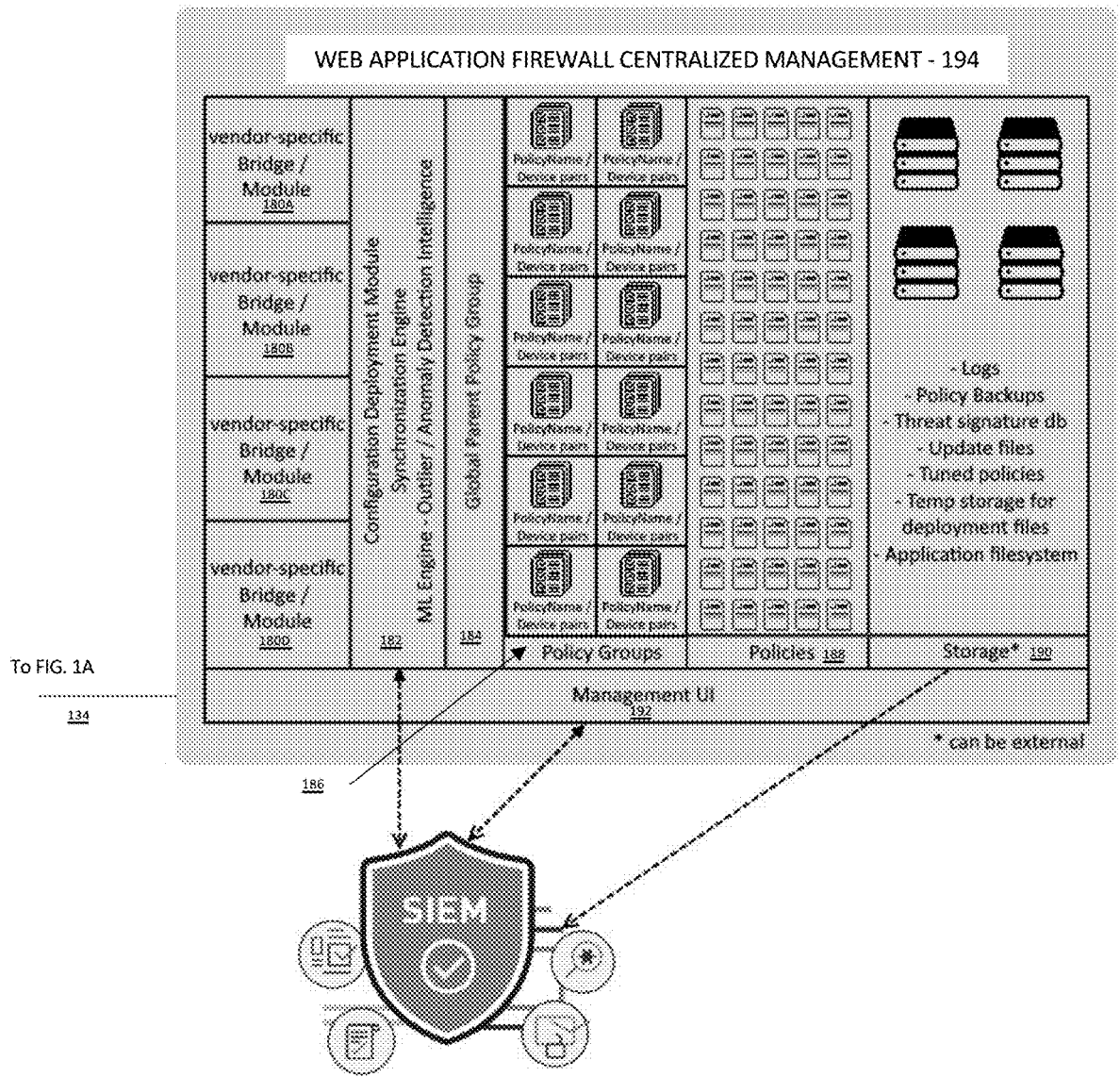
FIG. 1B (Partial View)

600A

Policy Group

| Name | Destinations |
|---|---|
| Name1 | Destinations1 |
| Name2 | Destinations2 |
| Name3 | Destinations3 |

600B

| Modified | Description | Is an Adhoc Policy Group | Policy Details | AI?s | Latest scan date | Policies In Sync? | Latest sig scan date | Signatures In Sync? |
|---|---|---|---|---|---|---|---|---|
| Aug. 22, 2022, 9:44 p.m. | Description1 | True | Details | {Name} | May 8, 2022, 7:08 p.m. | False | --- | --- |
| Aug. 22, 2022, 7:11 p.m. | Description2 | True | Details | {88153} | Aug. 22, 2022, 7:11 p.m. | False | --- | --- |
| Aug. 22, 2022, 6:25 p.m. | Description3 | True | Details | {209} | Aug. 22, 2022, 6:25 p.m. | False | --- | --- |

FIG. 6

700A
700B
FIG. 7

900A
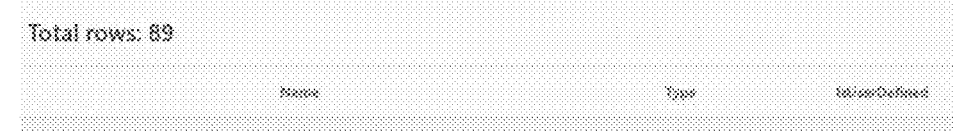
900B
FIG. 9

WEB APPLICATION FIREWALL CENTRALIZED MANAGEMENT

TECHNICAL FIELD OF DISCLOSURE

The present disclosure relates to information security and, more particularly, to machines, methods, and apparatus for the prevention of unauthorized access to resources of an information system through the use of centralized management of policies for web application firewall(s) across, inter alia, differing vendor devices and/or appliances contained therein, which protect distributed applications and/or devices from network or application-based attacks that may originate from outside a network and provide centralized management of traffic points where, inter alia, packet-based security constraints, policies, audits and the like, can be monitored and controlled.

BACKGROUND

The Open Systems Interconnection model (OSI model) is a conceptual model that provides a common basis for the coordination of ISO standards development for the purpose of systems interconnection. In the OSI reference model, the communications between computing systems are split into seven different abstraction layers: physical (layer 1), data-link (layer 2), network (layer 3), transport (layer 4), session (layer 5), presentation (layer 6), and application (layer 7).

The physical layer (1) is where raw bit streams are transmitted over a physical medium. The datalink layer (2) defines the format of data on the network. The network layer (3) is responsible for facilitating data transfer between two different networks. The network layer also finds the best physical path for the data to reach its destination; this is known as routing. The transport layer (4) transmits data using transmission protocols such as TCP and UDP. Layer 4 is responsible for end-to-end communication between the two devices. This includes taking data from the session layer and breaking it up into chunks called segments before sending it to layer 3. The transport layer on the receiving device is responsible for reassembling the segments into data the session layer can consume. The transport layer is also responsible for flow control and error control. Flow control determines an optimal speed of transmission to ensure that a sender with a fast connection does not overwhelm a receiver with a slow connection. The transport layer performs error control on the receiving end by ensuring that the data received is complete and requests retransmission if the data is incomplete. The session layer (5) maintains connections and is responsible for controlling ports and sessions. The presentation layer (6) ensures that data is in a usable format and is where data encryption occurs. Last, the application layer (7) is the human-computer interaction layer where applications can access network services. This is the only layer that directly interacts with data from the user. Software applications like web browsers and email clients rely on the application layer to initiate communications by utilizing protocols such as HTTP, FTP, SSH, SMTP, etc.

In traditional information security, network firewalls are devices that control access to secured LAN networks to protect them from unauthorized access. Network firewalls act as a filter that blocks incoming non-legitimate traffic from entering the LAN network and causing attacks. Network firewalls generally only deal with outside headers of packets passing through routers and switches typically in the network layer (i.e., layer 3) or the transport layer (i.e., layer 4) of the OSI model. The focus is on the source/destination IP addresses and the applicable source/destination IP ports. They operate in transparent and/or routed modes of operation. They provide only a basic level of protection against distributed denial of service (DDOS) attacks. Their placement is typically on the perimeter of network, which is commonly the Internet. Network firewalls only provide minimal web application protection. Common algorithms implemented in network firewalls include packet filtering, stateful/stateless inspection, and proxy firewalls (a/k/a application firewall or gateway firewall). Network firewalls can also provide some protection against attacks from less secure zones and prevent unauthorized users from accessing private networks.

Historical usage of network firewalls was sufficient in the past when web pages were typically digital equivalents of libraries in the form of static HTML pages. However, this is insufficient with respect to present-day web application traffic in which web apps need to accept traffic in the application layer (i.e., layer 7) from anywhere in the world transmitted to and/or exchanged with web application servers on the applicable ports, wherein malicious activity potentially is embedded as a payload inside that web application traffic.

A web application firewall ("WAF") is a network security firewall solution that protects web applications from HTTP/HTTPS and web application-based security vulnerabilities. Rather than dealing with source and destination header information, WAFs address the core contents of every packet or combinations of packets if bundled into a single request. WAFs operate on the core content of datagrams and look inside for a variety of attacks. WAFs provide coverage and DDOS protection in the application layer (i.e., layer 7) of the OSI model and have both active inspection and passive modes of operation. WAFs protect HTTP/HTTPs based servers and applications placed in Internet facing zones of network firewalls. WAFs are typically placed in a network in positions close to web and/or Internet facing applications. WAFs can provide all-encompassing web application protection including complete coverage at the application layer (i.e., layer 7) of the OSI model. Common WAF implementations utilize heuristics algorithms, anomaly detection algorithms, and signature-based algorithms. WAFs provide protection against SQL injection (a/k/a SQLI) attacks, cross-site scription (XSS) attacks, and DDOS attacks.

Although WAFs are known, current offerings are extremely complex and difficult to manage in view of: (a) the large variety of attacks, (b) the myriad number of web application instances and devices to be controlled and monitored, (c) the numerous differing policies (i.e., set of rules for a set of traffic that may be particular to a set of destinations) that are applicable to each application, application instance, device, etc.; (d) the distributed nature of web applications, data centers, load balancers, etc.; (e) the high frequency of changes (e.g., daily, hourly, or faster) that need to be implemented in various WAFs to account for policy changes to protect against threats in as close to real-time as possible; and (f) the need to synchronize policies and implementations across all of the foregoing. This is especially true because a very small datagram modification could change packet(s) from legitimate traffic to malicious and potentially disastrous traffic.

WAFs have other limitations as well. It is not possible to enable/disable WAFs on-demand. Individual wiring and connections to physical appliances is complicated, cumbersome, and prone to error. Change requests (CRQ) paperwork for logging and administration is extensive and burdensome.

There are difficulties in on-boarding each new application. WAFs only provide individual application control; there is no umbrella protection. Additionally, implementation of each separate WAF is time intensive and requires many person hours and days to even attempt to instantiate each individual WAF. Individual WAFs are not good solutions for any urgent protection requests.

Prior attempts at providing centralized management of WAFs are problematic. Configuration managers are not scalable. Often they are limited to only 1000 policies or 1000 devices (i.e., modules) or combination thereof. Collected logging requires the deployment of many data collection devices. They are still very complex and require pushing 1000s of policies (one for each policy) one at a time to deploy a single policy change over multiple virtual IP addresses (VIPs) and over multiple device(s) because of naming standards. Currently policies implemented have to be uniquely named, which consumes support capacity. In order to gain efficiencies, policies must be consolidated. Unless all changes are made through a single management interface provided by a single vendor, recoveries do not include changes made after regularly scheduled backups. Implementing all changes through a single vendor product would require complete changes in workflow processes, and only would provide backup/restore functionality for that particular vendor's implementation. Similarly, this only would provide reports for certificates on the vendor's individual implementation. Data collection for device statistics is not stable in such a system. There are connectivity losses for multiple devices that result in gaps of data. Document sizing restrictions are required.

Further, prior art centralization attempts do not allow IT managers to both "tune" a policy and then immediately copy that change to all other relevant policies. Instead, managers have to tune the policy locally, re-import the policy to the vendor system, then use it to push the change to other policies. This is because current vendor products require all application security module (ASM) policies to be changed only through their product (or the policy needs to be re-imported after being changed via any other process/manager). Further, current offerings have distinct limitations on what could be changed if the policy had a parent policy. In particular, in a parent policy setting: URLs and content profiles cannot be managed at all. Parameters cannot be managed for all options, and new parameters and manage signatures and meta chars cannot be created. File types cannot be managed to allow, only to disallow file types in general. Sensitive parameters cannot be managed. Signatures can only be disabled from a policy in its entirety. Signatures cannot be disabled at a granular level.

In sum, prior art systems are simply insufficient to provide the protection and centralized management required for WAFs especially in the context of enterprise systems that may have hundreds or thousands of constantly changing and/or evolving individual WAF policies spread across different vendor products, disparate data centers, load balancers, application instances (including groups and subgroups), which all require fast policy synchronization.

Hence there is a long felt and unsatisfied need in the field of information security for "centralized" management of WAFs to protect distributed applications and/or devices from malware traffic content (or the like) in network or application-based attacks in which management can be implemented at a singular location as opposed to existing prior art systems that each require their individual own "local" management inside each and every "separate" data center. Further, there is a need to gather metadata and other information from individual devices, models, regions, and data centers to integrate that information into policy groups and subgroups. In addition, there is a need to be able to utilize machine learning to detect and identify anomalies within various policies in a policy group and synchronize them as well as apply similar rules to other similar policy groups and detect anomalies within similar polices.

SUMMARY

In accordance with one or more arrangements of the disclosures contained herein, solution(s) are provided to address one or more of the shortcomings in the field of information security.

The following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a web application firewall centralized management process may comprise one or more portions of the steps of: providing, in data centers containing servers executing web applications, network-security devices having network interfaces; executing, in the network-security devices, web application firewalls for the web applications; load-balancing, by the network-security devices across the servers, the web applications; accessing, by a management processor through bridges (preferably vendor specific) coupled the network interfaces, the network-security devices; retrieving, by the management processor, an inventory of the web application firewalls; mapping, by the management processor based on configuration of the bridges, application parameters to management system parameters; retrieving, by the management processor through the bridges coupled to the network interfaces, metadata for policies for the web application firewalls in the network-security devices; storing, by the management processor in management memory, the metadata for the policies; assigning, by the management processor, the policies and the web application firewalls to policy-name device-pair policy groups; scanning, by the management processor through the bridges coupled to the network interfaces, a portion of the metadata for the policies to detect any changes in the policies; and synchronizing, by the management processor, the policy groups, the policy-name device-pair policies and the web application firewalls based on the changes.

In some arrangements, the web application firewall centralized management process may also create alerts for the changes based on business requirements such as, for example, detection of anomalies, identification of unprotected virtual IP addresses, or comparison of URLs to an access control list.

In some arrangements, the assignment of the policies and the web application firewalls to the policy-name device-pair policy groups can be performed manually, automatically, automatically using machine learning, automatically using supervised machine learning, automatically using semi-supervised machine learning, automatically using unsupervised machine learning, and/or automatically using heuristics. The assignment of a global parent policy group for the policy-name device-pair policy groups can be performed in a similar manner as desired.

In some arrangements, a management user interface can manage the policies, the policy-name device-pair policy groups, the global parent policy group, and the network-security devices.

In some arrangements, a web application firewall centralized management process can perform one or more of the following steps or portions thereof: providing, in data centers containing servers executing web applications, network-security devices having network interfaces, the network interfaces including external interfaces, internal interfaces, and management interfaces, the network interfaces having virtual IP addresses, the servers coupled to the internal interfaces; executing, in the network-security devices, web application firewalls for the web applications; load-balancing, by the network-security devices across the servers, the web applications; accessing, by a management processor through vendor-specific bridges coupled the management interfaces, the network-security devices; retrieving, by the management processor, an inventory of the web application firewalls; mapping, by the management processor based on configuration of the vendor-specific bridges, application parameters to management system parameters; retrieving, by the management processor through the vendor-specific bridges coupled to the management interfaces, metadata for policies for the web application firewalls in the network-security devices; storing, by the management processor in management memory, the metadata for the policies; assigning, by the management processor, the policies and the web application firewalls to policy-name device-pair policy groups; assigning, by the management processor, a global parent policy group for the policy-name device-pair policies; scanning, by the management processor through the vendor-specific bridges coupled to the management interfaces, a portion of the metadata for the policies to detect any changes in the policies; synchronizing, by the management processor, the policy-name device-pair groups, the policies, and the web application firewalls based on the changes; and executing, by the management processor, a management user interface to manage the global parent policy group, the policies, the policy-name device-pair policy groups, the network-security devices, and the virtual IP addresses.

In some arrangements, a web application firewall centralized management process can perform one or more of the following steps or portions thereof: providing, in data centers containing servers executing web applications, network-security devices having network interfaces, the network interfaces including external interfaces, internal interfaces, and management interfaces, the network interfaces having virtual IP addresses, the servers coupled to the internal interfaces; executing, in the network-security devices, web application firewalls for the web applications; load-balancing, by the network-security devices across the servers, the web applications; accessing, by a management processor through vendor-specific bridges coupled the management interfaces, the network-security devices; retrieving, by the management processor, an inventory of the web application firewalls; mapping, by the management processor based on configuration of the vendor-specific bridges, application parameters to management system parameters; automatically retrieving, by the management processor through the vendor-specific bridges coupled to the management interfaces, metadata for policies for the web application firewalls in the network-security devices; storing, by the management processor in management memory, the metadata for the policies; automatically assigning, by the management processor, the policies and the web application firewalls to policy-name device-pair policy groups; automatically assigning, by the management processor, a global parent policy group for the policy-name device-pair policies; automatically scanning, by the management processor through the vendor-specific bridges coupled to the management interfaces, a portion of the metadata for the policies to detect any changes in the policies; automatically synchronizing, by the management processor, the policy-name device-pair groups, the policies, and the web application firewalls based on the changes; automatically generating, by the management processor, alerts for the changes based on detection of anomalies, identification of unprotected virtual IP addresses, threat signatures, service bulletins for security vulnerabilities, or comparison of URLs to an access control list; and executing, by the management processor, a management user interface to manage the global parent policy group, the policies, the policy-name device-pair policy groups, the network-security devices, the virtual IP addresses, and the alerts.

In some arrangements, one or more various steps of processes disclosed herein can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIGS. 1A and 1B depics exemplary operating environment(s), architecture(s) and functionality to implement centralized management of web application firewalls in one or more information-security aspects of this disclosure.

FIG. 6 is a sample user interface structure that can be utilized in conjunction with one or more of the "policy group" aspects of this disclosure.

FIG. 7 is a sample user interface structure that can be utilized in conjunction with one or more of the "virtual IP address" aspects of this disclosure.

FIG. 8 is a sample user interface structure that can be utilized in conjunction with one or more of the "device" listing aspects of this disclosure.

FIG. 9 is a sample user interface structure that can be utilized in conjunction with one or more of the "signature sets" aspects of this disclosure.

DETAILED DESCRIPTION

Figure 2:
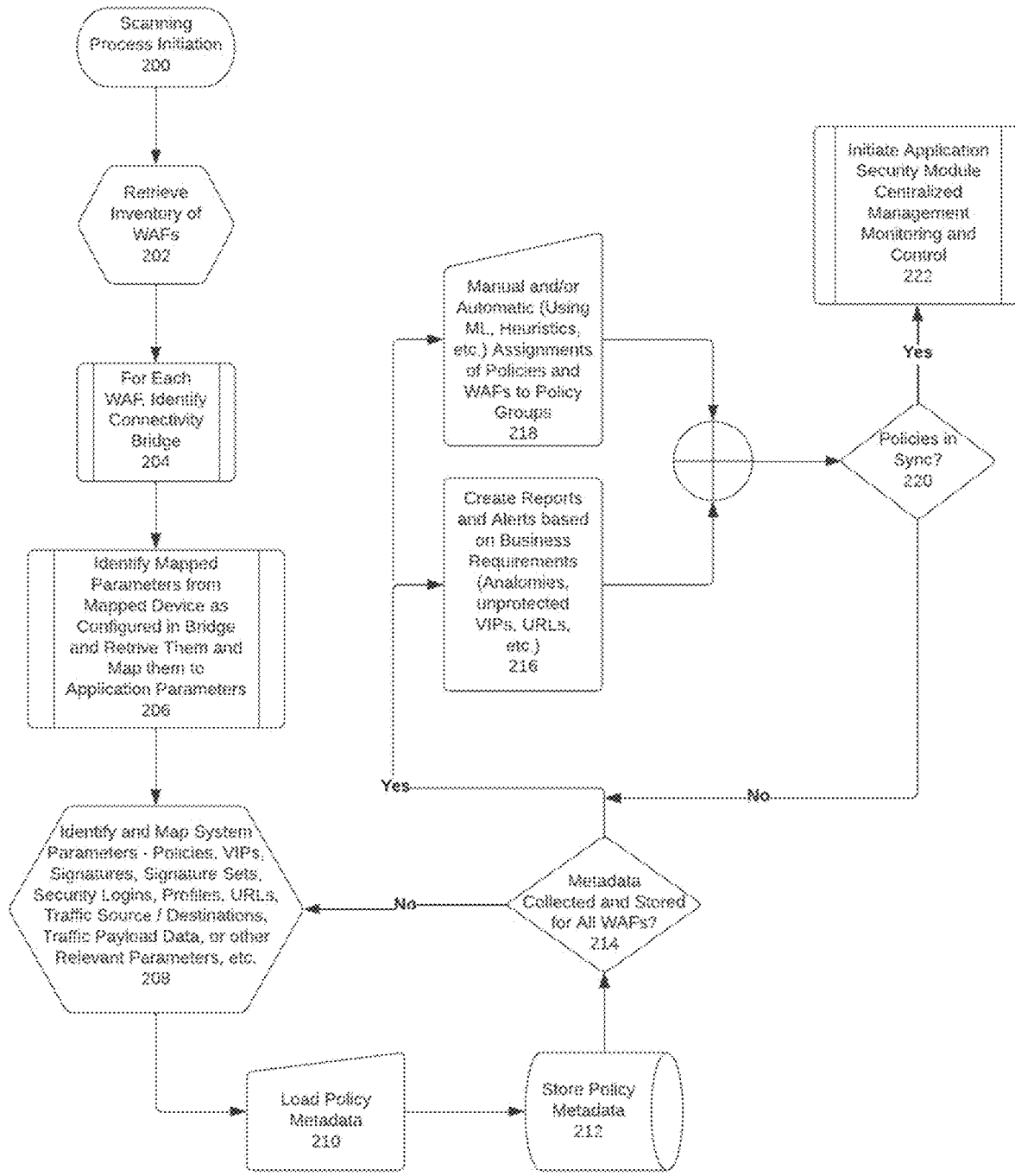
FIG. 2 is a sample data flow diagram for scanning and process initiation that can be utilized in conjunction with one or more information-security aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc.

Other specific or general components, machines, or the like are not depicted in the interest of brevity and would be understood readily by a person of skill in the art. One or more sample(s) of the foregoing, some of which are expressly depicted, can be seen in FIGS. 1A and 1B along with one or more sample associated components, subcomponents, related elements, sub-elements, etc.

As used throughout this disclosure, software, computer-executable instructions, data, modules, processes, routines, or the like can include one or more: active-learning, algorithms, alarms, alerts, applications, application program interfaces (APIs), artificial intelligence, approvals, attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning, middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs) etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol. One or more sample(s) of the foregoing, some of which are expressly depicted, can be seen in FIGS. 1A and 1B along with their associated components, subcomponents, related elements, sub-elements, etc.

By way of non-limiting disclosure, FIG. 1A illustrates access devices 100, such as any type of computer, tablet, mobile device, etc. connected to an enterprise through an Internet 102 or external facing network. The enterprise may include any number of data centers such as data center 104, 106, 108, 110 and these may be geographically dispersed or locally located. Each data center may have its own load balancing and security devices 112, 114, 116, 118, 120, 122, 124, 126 that can function as load balancers, prevent various types of attacks such as DDOS, and implement one or more web application firewalls. Sample devices 112-126 are commercially available from F5, Citrix, Google, AWS, etc.

The load balancing and security devices may be coupled to various interfaces 128 such as external interfaces 130, management interfaces 132, and internal interfaces 134, using virtual IP addresses VIPs 136, 138, 140, 142, 144, 146 etc. (not shown for data centers 106, 108, 110, etc.) or the like. Each data center 104-110 may have its own set(s) of servers (respectively 148-170) coupled to the internal interfaces 134.

By way of non-limiting disclosure, FIG. 1B is a continuation of FIG. 1A and depicts a web application firewall centralized management system 194 in accordance with one or more aspects of this disclosure for accomplishing the desired functionality. The system 194 is coupled to the data centers through management interfaces 134. The system 194 can be implemented in any centralized location cloud, anywhere in an enterprise, etc. and can be integrated and/or distributed.

Web application firewall centralized management system 194 contains individual policies 188 for each of the WAFs implemented in load balancing/security devices 112-126.

Policies 188 are organized into policy groups 186 as collections of individual policies and WAF devices (i.e., policy object/device pairs) that are grouped together based on technology constraints and/or business logic. For example, policies 188 may be grouped by application, environment, region, etc.

Global parent policy group(s) 184 are umbrella policies that are inherited by all child policies. Global parent policy group(s) 184 are useful so that changes do not have to be separately made to individual child policies in the group(s). A change made in a parent group automatically propagates the change to child policies.

The system 194 includes vendor-specific bridges/modules 180A, 180B, 180C, 180D, which bridge to load balance/security devices 112-126. The bridges/modules 180A-180D are implemented using API or integration provided by the device 112-126 manufacturer to map vendor specific parameters and functionality for WAF policies to generic parameters and functionality in the web application firewall centralized management system 194. Any web application firewall service can be implemented in the system 194 as hardware and/or software, and can be located locally, virtually, via the cloud, and/or other as desired.

Module 182 can be implemented as a collection of functions or individually as a standalone application or module. Module 182 includes a configuration deployment component that utilizes the functionality mapped in the vendor specific bridge/modules 180A-D to implement configuration updates from the centralized management system 194 to vendor products 112-126.

A synchronization engine component of the module 182 uses policy groups and checks whether all policies in group (which can be spread across data centers, devices, vendor products, etc.) are similar, and also is able to use the deployment module to deploy the changes to synchronize policies.

The machine language engine—outlier/anomaly detection intelligence component of module 182 uses multiple data sources including live traffic data from SIEM (security information and event management) enterprise resources, protection rules, and configuration items on WAF(s) systems as well as real-time threat information and cyber security news sources to automatically detect gaps in protection and predict and suggest potential security solutions, which can be proactively mitigated using WAF configuration changes.

Web application firewall centralized management 194 also includes internal or external, local/NAS/or distributed storage 190. The storage 190 can contain, inter alia, logs, policy backups, threat signature databases, update files (e.g., signatures, patches, rules, URLs to allow or disallow), tuned policies (i.e., collection(s) of what has been changed in the form of policy object(s) that can be deployed on the vendor system/vendor WAF using vendor-specific bridge by the conf deployment module, temporary storage for deployment files, and application file systems (e.g., source code, executables, etc.).

By way of non-limiting disclosure, FIG. 2 is a sample data flow diagram for scanning and process initiation that can be utilized in conjunction with one or more aspects of this disclosure.

A scanning process is initiated in step 200. The inventory of web application firewalls is retrieved in 202. For each web application firewall, one or more connectivity bridges are identified in 204. Mapped parameters from mapped devices as configured in bridges are identified and retrieved, then they are mapped to application parameters in 206. The parameters may include one or more of policies, virtual IP addresses, signatures, signature sets, security logins, profiles, URLs, traffic source/destinations, traffic payload data, or other relevant parameters, etc. 208.

Policy metadata is loaded in 210. The policy meta-data is stored in memory 212. Next a determination is made as to whether all metadata has been collected and stored for all web application firewalls in 214. If not, the process of step 208 is repeated. If all metadata has been collected and stored, then two processes may be performed in parallel or in series if desired. First, reports and alerts may be created based on business requirements (e.g., anomalies, unprotected VIPs, URLs, etc.) in 216. Second, manual and/or automatic assignments of policies and web application firewalls to policy groups is performed in 218. Automatic assignments may be performed using machine learning, heuristics or the like etc. The machine learning may be supervised learning, semi supervised learning, unsupervised learning, based on pattern detection, or other suitable automatic learning processes.

A determination may then be made as to whether all policies are synchronized in 220. If so, the system is ready for initiation of the application security module centralized management monitoring and control process in 222. Otherwise, process steps 216 and/or 218 may be repeated.

Figure 3:
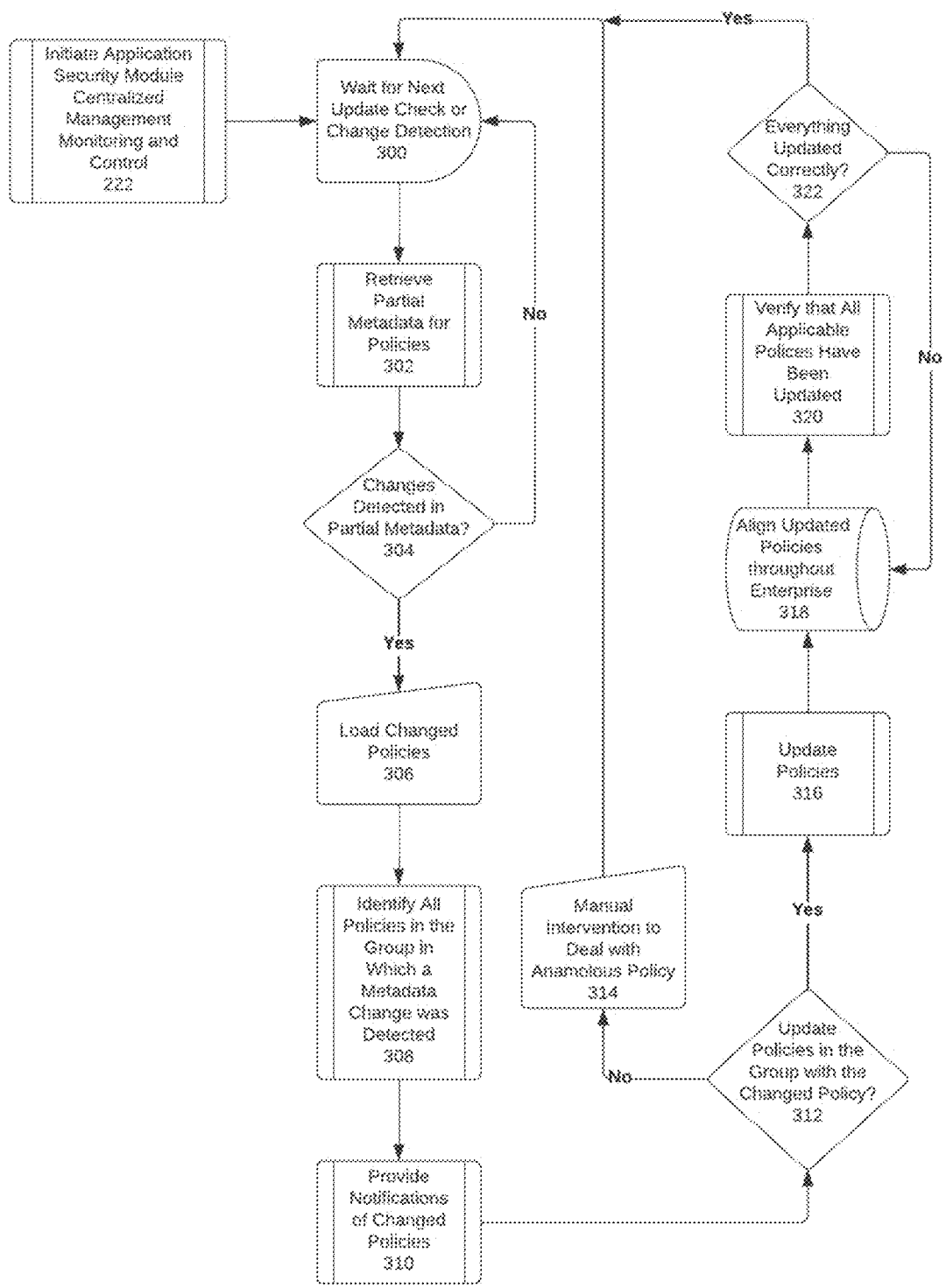
FIG. 3 is a sample data flow diagram for the process of application security module centralized management monitoring and control that can be implemented in conjunction with one or more information-security aspects of this disclosure.

By way of non-limiting disclosure, FIG. 3 is a sample data flow diagram for the process of application security module centralized management monitoring and control that can be implemented in conjunction with one or more aspects of this disclosure.

After initiation of the application security module centralized management monitoring and control process 222, the method may enter a wait cycle for the next update check or detection of changes in 300. Partial metadata for policies may be retrieved in 302. Retrieval of only a portion of the meta-data or policy information is especially helpful due to the tremendous size of the policies and corresponding system demands when retrieving large amounts of data. By only retrieving a portion of the meta-data across all of the policies, system performance is not degraded.

Based on a detection of changed metadata, policies that have been changed can be loaded in 306. All policies in the group in which a meta-data change was detected can then be identified in 308. Notifications of changed policies can be provided in 310. A determination can then be made as to whether to update policies in the group with the change policy in 312. This can be done automatically or based on supervisor review. Any anomalous policies can be addressed manually in intervention step 314. If no anomalous policies were detected, appropriate updates may be applied to the applicable policies in 316. Updated policies may then be aligned throughout the enterprise in 318. Next, a verification can be performed to confirm that all applicable policies have been updated in 330. If everything has been updated correctly in 322, the system can then re-enter the wait loop of 300. Otherwise, the alignment step of 318 can be repeated.

Figure 4:
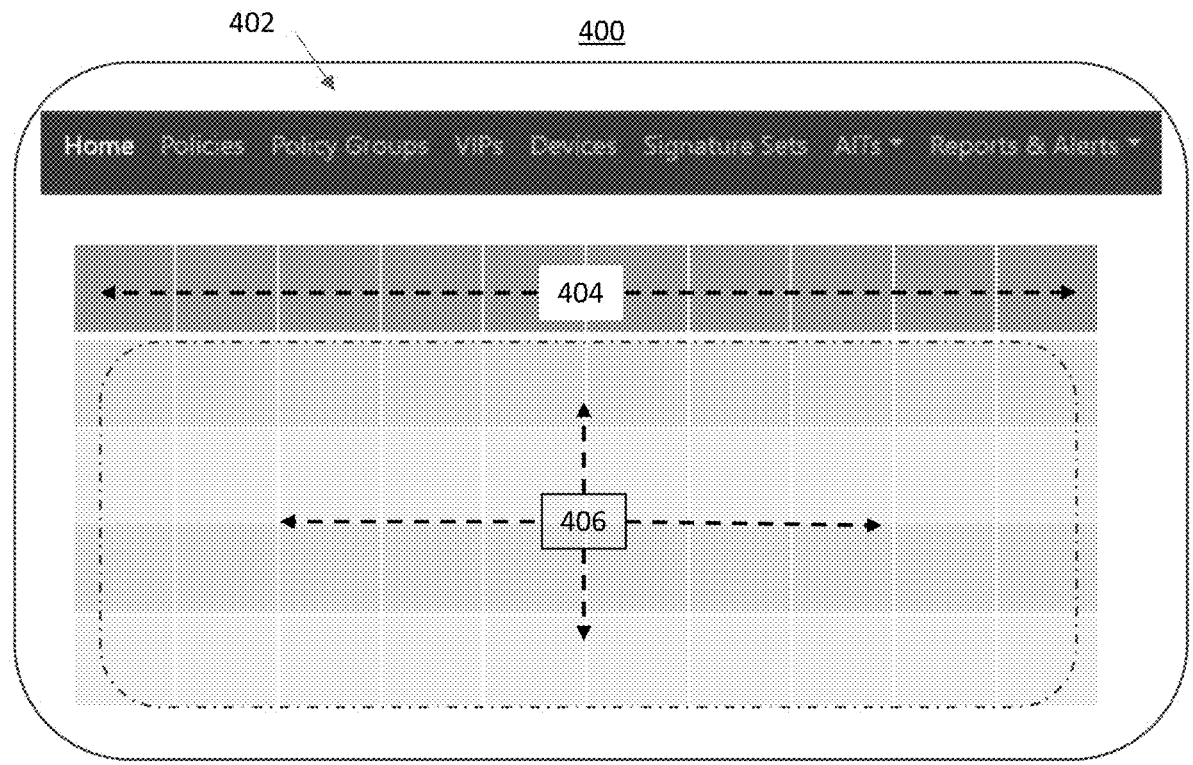
FIG. 4 is a sample user interface structure that can be utilized as a template layout in conjunction with one or more information-security aspects of this disclosure.

By way of non-limiting disclosure, FIG. 4 is a sample user interface structure that can be utilized as a template layout in conjunction with one or more aspects of this disclosure. An overall UI 400 can include a menu row 402 that has menu items that optionally have dropdown submenu selections. Sample menu items may have a "home" navigational option along with categories such as policies, policy groups, VIPs, devices, signature sets, AIGs, reports & alerts, etc. Each page may be represented in a table-like format with a header row 404 and subordinate data values in columns for each entry in the header row.

Figure 5:
FIG. 5 is a sample user interface structure that can be utilized in conjunction with one or more of the "policies" aspects of this disclosure.

As an example, FIG. 5 is a sample user interface structure that can be utilized in conjunction with one or more of the "policies" aspects of this disclosure. For ease of reading, the overall UI is split into left and right halves. The left half is shown in 500A and the right is shown in 500B. (When the UI would be viewed in use, the left and right halves would be joined together into a single window or display.) The UI for the "policies" selection could include fields such as: name, device, VIP, version DT, enforcement, learning mode, language encoding, timestamp, indication of whether the policy has a parent, the policy type, the parent name, whether modified, AIT, management URL, and number of signature sets.

As another example, FIG. 6 is a sample user interface structure that can be utilized in conjunction with one or more of the "policy group" aspects of this disclosure. For ease of reading, the overall UI is again split into left 600A and right halves 600B. The UI for the "policy group" selection could include fields such as: name, destinations, modified date, description, whether part of an adhoc group, polity details AITs, latest scan date, latest signature scan date, and whether signatures are in sync.

As a further example, FIG. 7 is a sample user interface structure that can be utilized in conjunction with one or more of the "virtual IP address" aspects of this disclosure. For ease of reading, the overall UI is again split into left 700A and right halves 700B. The UI for the virtual IP addresses selection could include fields such as: name, IP address, port, device, AIT, destination, profiles, iRules, whether a particular policy is enabled, whether websockets are in use, a websocket override option, an environment variable, LOB category, and a management URL.

As another example, FIG. 8 is a sample user interface structure that can be utilized in conjunction with one or more of the "device" listing aspects of this disclosure. For ease of reading, the overall UI is split into left 800A, center 800B, and right 800C portions. This "device" UI could include field names such as: account ID, name, management URL, management IP addressed, an indication of whether it is decommissioned, a signature version, hardware model, TMOS version, serial number, LTM environment, region, uptime, modified timestamp, comments, LOB, # of policies for device, # of VIPs, and # of signature sets.

As a final UI example, FIG. 9 is a sample user interface structure that can be utilized in conjunction with one or more of the "signature sets" aspects of this disclosure. The left half 900A of the UI could have fields for the name, type, and whether it is user defined, and the right 900B could include indications of whether to assign it to policies by default, default alarm, default block, default learn, and signature set ID.

Figure 10:
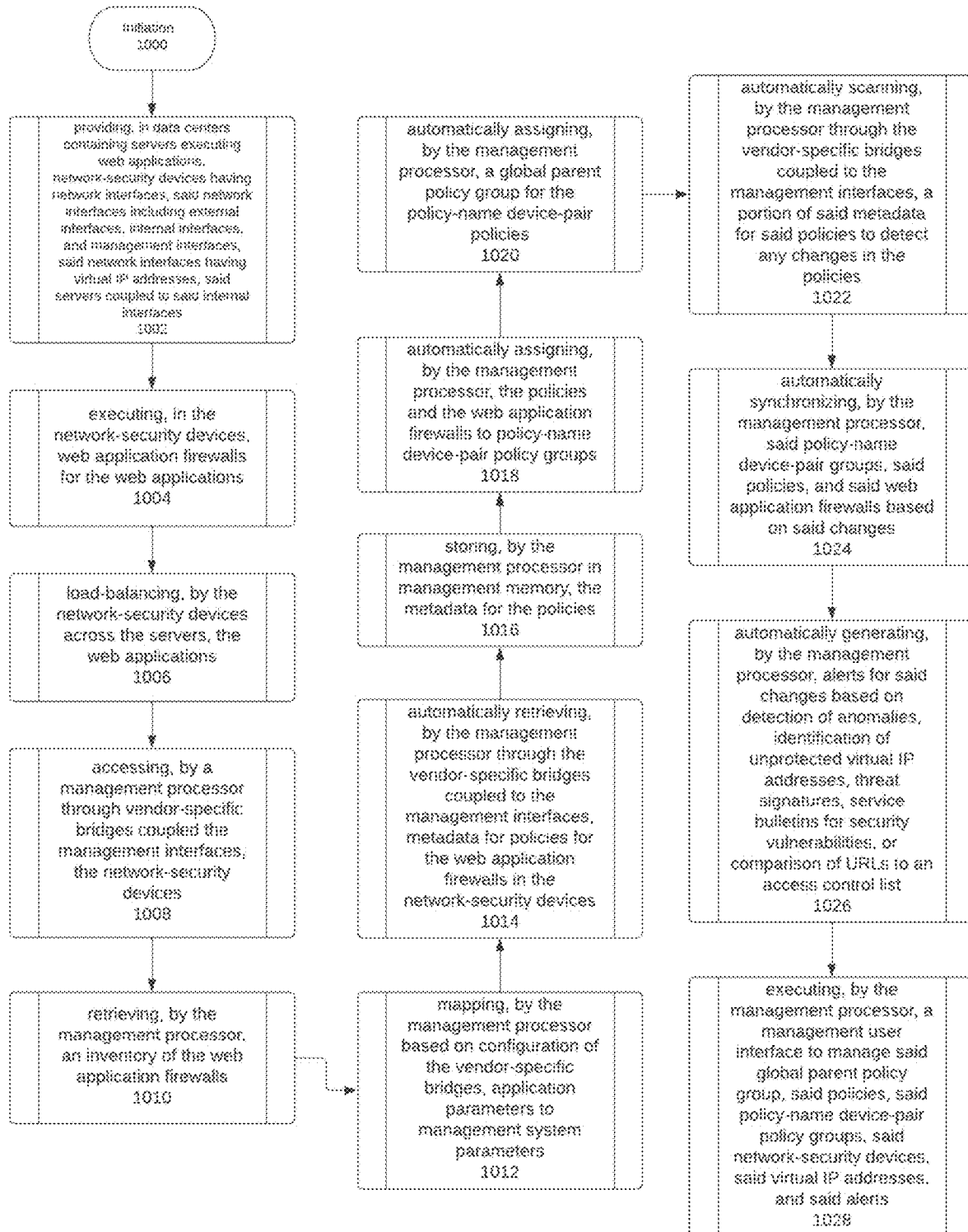
FIG. 10 is a sample data flow diagram for a web application firewall centralized management process that can be utilized in conjunction with one or more information-security aspects of this disclosure.

Last, FIG. 10 is a sample data flow diagram for a web application firewall centralized management process that can be utilized in conjunction with one or more aspects of this disclosure.

In 1002, in data centers containing servers executing web applications, network-security devices can be provided that have network interfaces, which can include external interfaces, internal interfaces, and management interfaces. The network interfaces can have virtual IP addresses. The servers can be coupled to the internal interfaces.

In 1004, web application firewalls for the web applications can be executed in the network-security devices, which can also in 1006 load balance application or server activity for the web applications across the servers.

In 1008, the network-security devices can be accessed by a management processor through vendor-specific bridges coupled the management interfaces. The management processor can retrieve an inventory in 1010 of the web application firewalls, and can map in 1012, based on configuration of the vendor specific bridges, application parameters to management system parameters.

In 1014, the management processor through the vendor-specific bridges coupled to the management interfaces can automatically retrieve metadata for policies for the web application firewalls in the network-security devices. In 1016, the metadata for the policies can be stored in management memory.

In 1018, the management processor can automatically assign the policies and the web application firewalls to policy-name device-pair policy groups and in 1020 can automatically assign a global parent policy group for the policy-name device-pair policies.

The management processor through the vendor-specific bridges coupled to the management interfaces can automatically scan a portion of the metadata for the policies to detect any changes in the policies in 1022.

In 1024, automatic synchronization can be performed by the management processor for the policy-name device-pair groups, the policies, and the web application firewalls based on the changes.

In 1026, the management processor can automatically generate alerts for the changes based on detection of anomalies, identification of unprotected virtual IP addresses, threat signatures, service bulletins for security vulnerabilities, or comparison of URLs to an access control list.

In 1028, the management processor can also execute a management user interface to manage the global parent policy group, the policies, the policy-name device-pair policy groups, the network-security devices, the virtual IP addresses, and the alerts.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A web application firewall centralized management process comprising the steps of:
    providing, in data centers containing servers executing web applications, network-security devices having network interfaces;
    executing, in the network-security devices, web application firewalls for the web applications;
    load-balancing, by the network-security devices across the servers, the web applications;
    accessing, by a management processor through bridges coupled the network interfaces, the network-security devices;
    retrieving, by the management processor, an inventory of the web application firewalls;
    mapping, by the management processor based on configuration of the bridges, application parameters to management system parameters;
    retrieving, by the management processor through the bridges coupled to the network interfaces, metadata for policies for the web application firewalls in the network-security devices;
    storing, by the management processor in management memory, the metadata for the policies;
    assigning, by the management processor, the policies and the web application firewalls to policy-name device-pair policy groups;
    scanning, by the management processor through the bridges coupled to the network interfaces, a portion of said metadata for said policies to detect any changes in the policies; and
    synchronizing, by the management processor, said policy groups, said policy-name device-pair policies and said web application firewalls based on said changes.

2. The web application firewall centralized management process of claim 1 further comprising the step of: creating alerts for said changes based on business requirements.

3. The web application firewall centralized management process of claim 2 wherein the business requirements include detection of anomalies, identification of unprotected virtual IP addresses, or comparison of URLs to an access control list.

4. The web application firewall centralized management process of claim 3 wherein the assigning of the policies and the web application firewalls to the policy-name device-pair policy groups is performed manually.

5. The web application firewall centralized management process of claim 3 wherein the assigning of the policies and the web application firewalls to the policy-name device-pair policy groups is performed automatically.

6. The web application firewall centralized management process of claim 3 wherein the assigning of the policies and the web application firewalls to the policy-name device-pair policy groups is performed automatically using machine learning.

7. The web application firewall centralized management process of claim 3 wherein the assigning of the policies and the web application firewalls to the policy-name device-pair policy groups is performed automatically using supervised machine learning.

8. The web application firewall centralized management process of claim 3 wherein the assigning of the policies and the web application firewalls to the policy-name device-pair policy groups is performed automatically using semi-supervised machine learning.

9. The web application firewall centralized management process of claim 3 wherein the assigning of the policies and the web application firewalls to the policy-name device-pair policy groups is performed automatically using unsupervised machine learning.

10. The web application firewall centralized management process of claim 3 wherein the assigning of the policies and the web application firewalls to the policy-name device-pair policy groups is performed automatically using heuristics.

11. The web application firewall centralized management process of claim 5 wherein the bridges are vendor specific.

12. The web application firewall centralized management process of claim 11 further comprising the step of: assigning, by the management processor, a global parent policy group for the policy-name device-pair policy groups.

13. The web application firewall centralized management process of claim 12 further comprising the step of: executing, by the management processor, a management user interface to manage said policies, said policy-name device-pair policy groups, said global parent policy group, and said network-security devices.

14. A web application firewall centralized management process comprising the steps of:
    providing, in data centers containing servers executing web applications, network-security devices having network interfaces, said network interfaces including external interfaces, internal interfaces, and management interfaces, said network interfaces having virtual IP addresses, said servers coupled to said internal interfaces;
    executing, in the network-security devices, web application firewalls for the web applications;
    load-balancing, by the network-security devices across the servers, the web applications;
    accessing, by a management processor through vendor-specific bridges coupled the management interfaces, the network-security devices;
    retrieving, by the management processor, an inventory of the web application firewalls;
    mapping, by the management processor based on configuration of the vendor-specific bridges, application parameters to management system parameters;
    retrieving, by the management processor through the vendor-specific bridges coupled to the management interfaces, metadata for policies for the web application firewalls in the network-security devices;
    storing, by the management processor in management memory, the metadata for the policies;
    assigning, by the management processor, the policies and the web application firewalls to policy-name device-pair policy groups;
    assigning, by the management processor, a global parent policy group for the policy-name device-pair policies;
    scanning, by the management processor through the vendor-specific bridges coupled to the management interfaces, a portion of said metadata for said policies to detect any changes in the policies;
    synchronizing, by the management processor, said policy-name device-pair groups, said policies, and said web application firewalls based on said changes; and
    executing, by the management processor, a management user interface to manage said global parent policy group, said policies, said policy-name device-pair policy groups, said network-security devices, and said virtual IP addresses.

15. The web application firewall centralized management process of claim 14 further comprising the step of: creating alerts for said changes based on business requirements.

16. The web application firewall centralized management process of claim 15 wherein the business requirements include detection of anomalies, identification of unprotected virtual IP addresses, or comparison of URLs to an access control list.

17. The web application firewall centralized management process of claim 16 wherein the assigning of the policies and the web application firewalls to the policy-name device-pair policy groups is performed manually.

18. The web application firewall centralized management process of claim 16 wherein the assigning of the policies and the web application firewalls to the policy-name device-pair policy groups is performed automatically.

19. The web application firewall centralized management process of claim 16 wherein the assigning of the policies and the web application firewalls to the policy-name device-pair policy groups is performed automatically using supervised machine learning, semi-supervised machine learning, unsupervised machine learning, or heuristics.

20. A web application firewall centralized management process comprising the steps of:
providing, in data centers containing servers executing web applications, network-security devices having network interfaces, said network interfaces including external interfaces, internal interfaces, and management interfaces, said network interfaces having virtual IP addresses, said servers coupled to said internal interfaces;
executing, in the network-security devices, web application firewalls for the web applications;
load-balancing, by the network-security devices across the servers, the web applications;
accessing, by a management processor through vendor-specific bridges coupled the management interfaces, the network-security devices;
retrieving, by the management processor, an inventory of the web application firewalls;
mapping, by the management processor based on configuration of the vendor-specific bridges, application parameters to management system parameters;
automatically retrieving, by the management processor through the vendor-specific bridges coupled to the management interfaces, metadata for policies for the web application firewalls in the network-security devices;
storing, by the management processor in management memory, the metadata for the policies;
automatically assigning, by the management processor, the policies and the web application firewalls to policy-name device-pair policy groups;
automatically assigning, by the management processor, a global parent policy group for the policy-name device-pair policies;
automatically scanning, by the management processor through the vendor-specific bridges coupled to the management interfaces, a portion of said metadata for said policies to detect any changes in the policies;
automatically synchronizing, by the management processor, said policy-name device-pair groups, said policies, and said web application firewalls based on said changes;
automatically generating, by the management processor, alerts for said changes based on detection of anomalies, identification of unprotected virtual IP addresses, threat signatures, service bulletins for security vulnerabilities, or comparison of URLs to an access control list; and
executing, by the management processor, a management user interface to manage said global parent policy group, said policies, said policy-name device-pair policy groups, said network-security devices, said virtual IP addresses, and said alerts.

* * * * *